United States Patent
Choi et al.

(10) Patent No.: US 8,675,963 B2
(45) Date of Patent: Mar. 18, 2014

(54) METHOD AND APPARATUS FOR AUTOMATIC BRIGHTNESS ADJUSTMENT OF IMAGE SIGNAL PROCESSOR

(75) Inventors: Seong Hoon Choi, Seoul (KR); Jang Hyun Park, Seoul (KR); Chang Sun Kim, Seoul (KR); Seong Soo Lee, Seoul (KR); Jung Hwan Choi, Seoul (KR)

(73) Assignees: Electronics and Telecommunications Research Institute, Daejeon (KR); Soongsil University Research Consortium Techno-Park, Seoul (KR)

(*) Notice: Subject to any disclaimer, the term of this patent is extended or adjusted under 35 U.S.C. 154(b) by 116 days.

(21) Appl. No.: 13/317,295

(22) Filed: Oct. 14, 2011

(65) Prior Publication Data

US 2012/0141028 A1 Jun. 7, 2012

(30) Foreign Application Priority Data

Dec. 1, 2010 (KR) .......................... 10-2010-0121428

(51) Int. Cl.
*G06K 9/00* (2006.01)

(52) U.S. Cl.
USPC ........................................................ 382/168

(58) Field of Classification Search
USPC ........................................................ 382/168
See application file for complete search history.

(56) References Cited

U.S. PATENT DOCUMENTS

| | | | | |
|---|---|---|---|---|
| 5,765,199 | A  * | 6/1998 | Chang et al. | 711/168 |
| 6,882,583 | B2 * | 4/2005 | Gorman et al. | 365/200 |
| 8,295,596 | B1 * | 10/2012 | Srinivasan et al. | 382/168 |
| 2003/0161549 | A1 * | 8/2003 | Lei et al. | 382/274 |
| 2004/0109091 | A1 * | 6/2004 | Park et al. | 348/673 |
| 2004/0109612 | A1 * | 6/2004 | Park et al. | 382/254 |
| 2008/0037868 | A1 * | 2/2008 | Han et al. | 382/169 |
| 2009/0110274 | A1 * | 4/2009 | Atanassov et al. | 382/169 |
| 2010/0110588 | A1 * | 5/2010 | Arai et al. | 360/135 |

* cited by examiner

*Primary Examiner* — Jingge Wu
(74) *Attorney, Agent, or Firm* — Rabin & Berdo, P.C.

(57) ABSTRACT

An automatic brightness adjusting method and apparatus for image signal processor (ISP) is provided. The image processing apparatus may include a histogram generating unit, a cumulative distribution function calculator, and a histogram equalization (HE) unit. The histogram generating unit may generate a histogram of brightness values of pixels in an input image. The cumulative distribution function calculator may generate a cumulative distribution function and an inverse cumulative distribution function, based on the generated histogram. The HE unit may generate a conversion function based on the cumulative distribution function and the inverse cumulative distribution function, and may apply HE to the input image based on the conversion function so as to generate an output image.

18 Claims, 9 Drawing Sheets

110

115

120

125

130

135

810

820

830

840

910

920

930

940

METHOD AND APPARATUS FOR AUTOMATIC BRIGHTNESS ADJUSTMENT OF IMAGE SIGNAL PROCESSOR

CROSS-REFERENCE TO RELATED APPLICATION

This application claims the benefit of Korean Patent Application No. 10-2010-0121428, filed on Dec. 1, 2010, in the Korean Intellectual Property Office, the disclosure of which is incorporated herein by reference.

BACKGROUND

1. Field of the Invention

The present invention relates to an automatic brightness adjusting method and apparatus for an image signal processor (ISP), and more particularly, to an automatic brightness adjusting method and apparatus that may adjust a brightness of an output image to an appropriate brightness so as to improve a contrast.

2. Description of the Related Art

An image signal processor (ISP) may be a processor that pre-processes an image signal input from an image sensor so that the image signal may be used in an application.

The ISP may perform image compensation, for example, color interpolation, color correction, gamma correction, color space conversion, and the like, and subsequently, may perform image compensation, for example, automatic white balancing (AWB) and automatic exposure (AE), and the like.

The AE may indicate a process that calculates a brightness of an image so as to automatically set the image to have an appropriate brightness or may indicate a block performing the process. That is, the AE may be a digital control technology that maintains the image to have an optimal brightness, irrespective of an illuminance of a light source or may be a device to which the digital control technology is applied.

The AE may sense an amount of projected light so as to control an iris, a shutter speed, and an analog gain.

Generally, the AE may calculate an average brightness of an image and may adjust a gain so that the image has the same brightness as a predetermined target brightness. A brightness of a screen is adjusted based on the AE and thus, a naturalness of the image may be enhanced.

The brightness adjustment by the AE may be insufficient to extract characteristics of an object requested by a vision system. Unlike a general camera, an image processing technology may need to be applied to the vision camera.

When a brightness of an image is intensively distributed in a predetermined range, the AE may be insufficient to clearly distinguish an outline or characteristics of an object. In this example, there is a desire for a process that broadens original intervals of brightness that are intensively distributed so as to improve a contrast of the image.

A histogram equalization (HE) may indicate a scheme that generates a conversion function based on a histogram of an input image, and may be used to improve a contrast.

The HE may generate an output image in which pixels having low brightness values and pixels having high brightness values are evenly distributed, irrespective of a histogram of brightness values of pixels of the input image. The HE may adjust an average brightness of an image to be constant. Therefore, the HE may be used instead of an AE function of the ISP.

In terms of implementation of hardware, the HE may be implemented by a simple operation and thus, an additional memory space for storing a histogram may be requested. Since the HE is simply implemented, the HE may process a relatively large image in a relatively quick period of time.

Generally, the HE may generate an output image that is equalized to be brighter, based on a histogram cumulative distribution function of the input image.

Therefore, when a brightness of the input image is intensively distributed in a relatively low brightness band or a relatively high brightness band, the output image based on the HE may have an improved contrast but may be distorted in an unnatural manner.

Examples of an algorithm that supplements the drawback of the HE may include a brightness preserving bi-histogram equalization (BBHE) algorithm, a dualistic sub-image histogram equalization (DSIHE) algorithm, a recursive mean-separate histogram (RMSHE) algorithm, and the like. The algorithms may be complex and may require a great amount of calculation. Therefore, when the algorithms are implemented in hardware, performance of an entire ISP chip may deteriorate.

SUMMARY

An aspect of the present invention provides an automatic brightness adjusting apparatus and method based on a histogram equalization (HE) scheme.

Another aspect of the present invention also provides an automatic brightness adjusting apparatus and method based on a a cumulative distribution function and an inverse cumulative distribution function.

According to an aspect of the present invention, there is provided a method of automatically adjusting a brightness of an image, the method including generating a histogram of brightness values of pixels of an input image, generating a conversion function based on a cumulative distribution function and an inverse cumulative distribution function of the histogram, and generating an output image by applying, based on the conversion function, histogram equalization (HE) to the input image.

The generating of the histogram may include sampling the pixels of the input image, and generating the histogram based on the sampled pixels.

The generating of the conversion function may include generating the cumulative distribution function and the inverse cumulative distribution function, based on the histogram, and generating the conversion function based on the cumulative distribution function and the inverse cumulative distribution function.

The inverse cumulative distribution function may be generated based on a number of pixels used for generating the histogram, the cumulative distribution function, and the histogram.

The conversion function may be generated based on a first HE function that is based on the cumulative distribution function and a second HE function that is based on the inverse cumulative distribution function.

The conversion function may be configured as a look-up table.

According to another aspect of the present invention, there is provided an image processing apparatus, the apparatus including a histogram generating unit to generate a histogram of brightness values of pixels of an input image, a cumulative distribution function calculator to generate a cumulative distribution function and an inverse cumulative distribution function, and a histogram equalization (HE) unit to generate a conversion function based on the cumulative distribution function and the inverse cumulative distribution function, and to generate an output image by applying, based on the conversion function, HE to the input image.

The histogram generating unit may include a dual-port static random access memory (SRAM), and the HE unit may include a single-port SRAM.

A brightness value of a pixel of the input image may be input as an address of the dual-port SRAM, and a data value of the address of the dual-port SRAM may be increased by 1 due to the input.

The HE unit may apply, based on the conversion function, HE to the input image by utilizing a look-up table.

The cumulative distribution function calculator may apply a shift operation to a value indicating a number of pixels of the input image so as to calculate an approximate value of a number of pixels used for generating the histogram.

The histogram generating unit may perform sampling of the pixels of the input image, and may generate the histogram based on the sample pixels.

Additional aspects, features, and/or advantages of the invention will be set forth in part in the description which follows and, in part, will be apparent from the description, or may be learned by practice of the invention.

EFFECT

Embodiments of the present invention may include an automatic brightness adjusting method and apparatus based on a histogram equalization (HE) scheme.

Embodiments of the present invention may include an automatic brightness adjusting method and apparatus based on a cumulative distribution function and an inverse cumulative distribution function.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
FIG. 1 is a diagram illustrating a comparison of an automatic exposure (AE) scheme and a histogram equalization (HE) scheme according to an embodiment of the present invention.
Figure 1:
Figure 1:
Figure 1:
Figure 1:
Figure 1:

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a comparison of an automatic exposure (AE) scheme and a histogram equalization (HE) scheme according to an embodiment of the present invention.

Hereinafter, a scheme of calculating an AE gain will be described.

The scheme of calculating the AE gain applied to an output frame is given by Equation 1.

$$\text{Frame\_Gain} = \frac{\text{Target\_Y}}{\text{Frame\_AVE}} \qquad \text{[Equation 1]}$$

In Equation 1, Target_Y denotes a brightness value set for the output frame. Frame_AVE denotes an average brightness value of an input image. Frame_Gain denotes a gain value with respect to a frame.

A scheme of calculating a brightness value of a pixel of the output frame is given by Equation 2.

$$\text{Pixel}_{out} = \text{Frame\_Gain} \times \text{pixel}_{in} \qquad \text{[Equation 2]}$$

In Equation 2, $\text{Pixel}_{in}$ denotes a brightness value of a predetermined pixel of the input image. $\text{Pixel}_{out}$ denotes a brightness value of a pixel corresponding to the predetermined pixel of the output image.

In terms of implementation of hardware, a division operation may be required to calculate the AE gain based on Equation 1 since the average brightness value of the input image may not be constant. Also, a multiplication operation may be required to apply the calculated AE gain to the input image based on Equation 2. Conversely, the division operation and the multiplication operation may be inefficient for hardware for a high definition moving picture.

A vision system may appropriately adjust a brightness of an image and may adjust the image so that objects in the image may be distinguished.

The AE scheme based on Equation 1 and Equation 2 may adjust only a brightness of an image. Accordingly, the AE scheme may adjust a image which have a strong exposure or weak exposure, but may not provide an effect of improving a contrast.

Hereinafter, the HE scheme will be described.

A cumulative distribution function of the HE scheme may be calculated based on Equation 3.

$$CDF(n) = \sum_{k=0}^{n} Hist(k) \qquad \text{[Equation 3]}$$

In Equation 3, Hist (k) denotes distribution of brightness values of pixels in an image. For example, Hist (k) may denote a number of pixels having a brightness value of k among the pixels in the image. That is, Hist may be a histogram of brightness values of pixels of an input image.

Here, CDF (n) may denote a cumulative distribution function of a histogram (Hist(k)) of the input image. CDF (n) may denote a value obtained by adding all values of histograms with respect to values less than or equal to n.

An HE function with respect to a predetermined brightness value of n, that is, HE(n), may be calculated according to Equation 4.

$$HE(n) = \frac{CDF(n)}{\text{Pixel}_{total}} \times B_{max}$$ [Equation 4]

In Equation 4, $\text{Pixel}_{total}$ denotes a number of pixels used for generating a histogram. For example, $\text{Pixel}_{total}$ may denote a total number of pixels in an image. $B_{max}$ denotes a maximum value of brightness values of pixels. HE(n) denotes a brightness value converted from the brightness value of n.

To apply the HE scheme to an image, a look-up table including HE (n) calculated based on Equation 4 may be used. In this example, n may be an integer value greater than or equal to 0 and less than or equal to $B_{max}$. The look-up table may be a table that stores output brightness values corresponding to input brightness values. That is, an index of the look-up table may correspond to an input brightness value, and a value of an entry in the look-up table may correspond to an output brightness value.

When the look-up table is used, an output brightness value corresponding to a predetermined input brightness value may be calculated without an additional operation, as shown in Equation 5.

$$\text{Pixel}_{out} = HE(\text{Pixel}_{in})$$ [Equation 5]

Subsequently, a performance of the AE scheme and a performance of the HE scheme may be compared.

Referring to FIG. 1, images 110, 120, and 130 on the left side have a relatively even histogram distribution. The histogram distribution may be histogram distribution of brightness values of pixels in an image. In images 115, 125, and 135 on the right side, brightness values of pixels in the images are intensively distributed on upper portions. Images 110 and 115 at the first row are original images.

The images 120 and 125 at the second row are AE images. A target brightness of AE may be a half the maximum value of a brightness value of a pixel.

The images 130 and 135 at the third row are HE images.

According to an analysis with respect to the images 110, 120, and 130, the original image 110 and the AE image 120 has little difference. When the HE image 130 is compared to the original image 110, the HE image 130 may maintain an average brightness value and have an improved contrast.

According to an analysis with respect to the images 115, 125, and 135, the AE image 125 may decrease a brightness of an entire image based on a target brightness. Accordingly, the AE image 125 is distorted. The HE image 135 has a dramatically improved contrast. Conversely, a difference in a brightness between the original image 115 and the HE image 135 increases and thus, the HE image is unnatural.

According to a comparison between the AE scheme and the HE scheme in terms of implementation of hardware, the AE scheme may require a division operation to calculate a gain value as given in Equation 1. Also, a multiplication operation may be required to apply the calculated gain value to an input image, as given in Equation 2. Therefore, as a size of an image increases, a load due to the division operation and the multiplication operation may be applied to the AE scheme.

The HE scheme may generate a look-up table according to Equation 4. In general, a number of pixels in an image and a maximum value of brightness values of the pixels in the image are constant. Accordingly, the HE scheme may be embodied without using a division operation and a multiplication operation.

When the look-up table is used, the HE scheme may be quickly applied without an additional operation.

Figure 2:
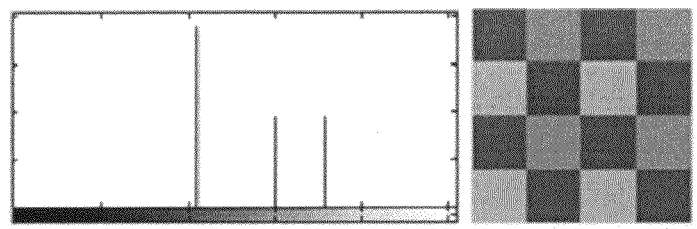
FIG. 2 is a diagram illustrating an HE scheme according to an embodiment of the present invention.
Figure 2:
Figure 2:
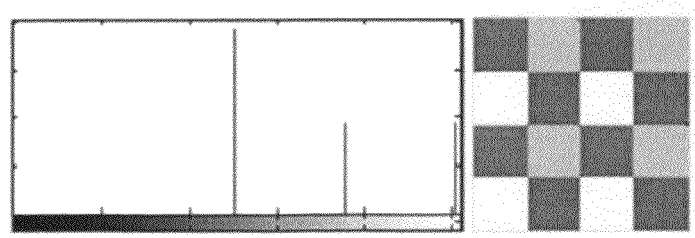

FIG. 2 illustrates an HE scheme according to an embodiment of the present invention.

A first image 215 may be an original image. A first histogram 210 may be a histogram of the first image 215.

A second image 225 may be an AE image. A second histogram 220 may be a histogram of the second image 225.

A third image 235 may be an HE image. A third histogram 230 may be a histogram of the third image 235.

As described in the foregoing, the HE scheme may improve a contrast of an image using only a simple operation.

When brightness values of pixels are intensively distributed in a predetermined area, an image generated based on the HE scheme may be an unnatural image such as the images 130 and 135 in the third row of FIG. 1, since a result value of a cumulative distribution function with respect to a predetermined value of n, that is, CDF (n), includes a histogram value Hist (n) of n.

Specifically, the predetermined area in which the brightness values are intensively distributed is a dark portion, the corresponding area may be converted to a significantly bright area based on the HE scheme.

Here, brightness values of pixels in the original image 215 are distributed in a predetermined area. In the original image 215, a darkest portion is double the brightest portion.

The original image 215 may have an average brightness. Accordingly, a brightness and a contrast of the AE image 225 is modestly changed.

The HE image 235 may have an improved contrast when compared to the original image 215 and the AE image 225. In this example, histogram distribution moves toward a high brightness band. Therefore, the HE image 235 is unnatural.

When a histogram of an input image is intensively distributed in a relatively low brightness band or a relatively high brightness band, the HE scheme may equalize the input image to be brighter. Accordingly, an output image distorted by the HE scheme may be generated.

Figure 3:
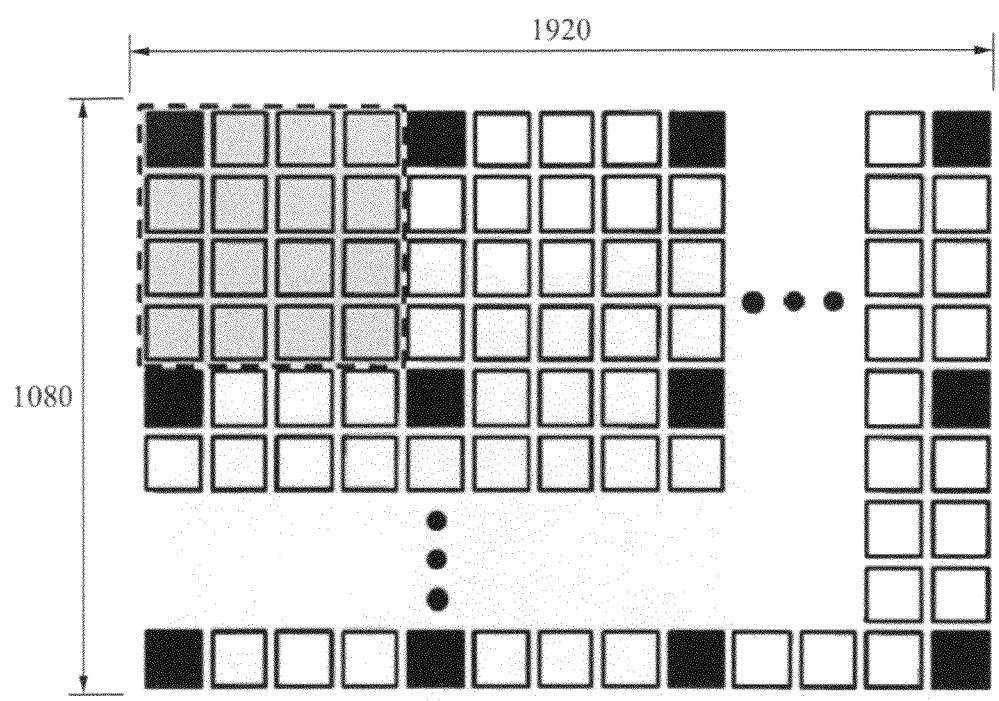
FIG. 3 is a diagram illustrating a pixel sampling process for generating a histogram according to an embodiment of the present invention.

FIG. 3 illustrates a pixel sampling process for generating a histogram according to an embodiment of the present invention.

When an original image is an image in a level of full high-definition (HD), the original image may include two million pixels, that is, 1920×1080 pixels.

To calculate a histogram with respect to an image of 1920× 1080 pixels, a memory of about 16.59 kilobytes (Kb) may be required.

An input image may be generated by sampling the original image, and memory consumption and an amount of operation may be reduced and thus, a hardware resource may be used effectively.

Generally, a high definition image and a low definition image obtained by decreasing the high definition image to a predetermined size has little difference in terms of information associated an image.

Referring to FIG. 3, a total average brightness of an image of 1920×1080 and a total average brightness of an image of 480×270, sampled to be one-sixteenth the size of the image of 1920×1080, have little difference. Therefore, an error between the both images may be negligible.

Figure 4:
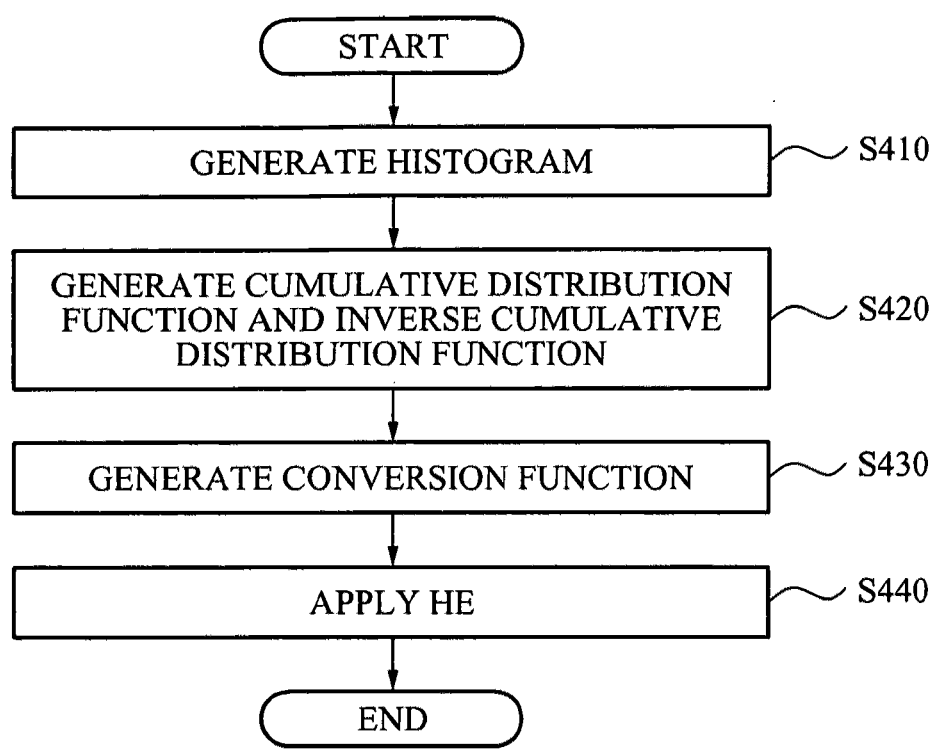
FIG. 4 is a diagram illustrating an automatic brightness adjusting method using a cumulative distribution function and an inverse cumulative distribution function according to an embodiment of the present invention.

When sampling is performed, $\text{Pixel}_{total}$ denotes a number of sampled pixels. FIG. 4 illustrates an automatic brightness adjusting method using a cumulative distribution function and inverse cumulative distribution function according to an embodiment of the present invention.

In operation S410, a histogram with respect to brightness values of pixels in an input image may be generated.

In this example, operation S410 may include sampling of the pixels in the input image and generating of the histogram based on the sampled pixels.

In operation S420, a cumulative distribution function and an inverse cumulative distribution function may be generated based on the generated histogram.

The drawback of the HE scheme, described with reference to FIG. 2 in the foregoing, is caused since only the cumulative distribution function is used. However, an improved HE scheme that uses the cumulative distribution function and the inverse cumulative distribution function may supplement the drawback of the conventional HE scheme.

The inverse cumulative distribution function may be calculated according to Equation 6.

$$CDF_{inv}(n) = Pixel_{total} - CDF(n) + Hist(n) \quad \text{[Equation 6]}$$

In Equation 6, $CDF_{inv}$ denotes the inverse cumulative distribution function. $CDF_{inv}$ may be generated based on $Pixel_{total}$ indicating a number of pixels used for generating a histogram, CDF indicating the cumulative distribution function, and Hist indicating a histogram.

In operation S430, a conversion function may be generated based on the cumulative distribution function and the inverse cumulative distribution function.

The conversion function may be generated based on an HE function (HE)?) based on the cumulative distribution function and an inverse HE function ($HE_{inv}$) based on the inverse cumulative distribution function.

$HE_{inv}$ may be calculated according to Equation 7.

$$HE_{inv}(n) = \frac{Pixel_{Total} - CDF_{inv}(n)}{Pixel_{total}} \times B_{max} \quad \text{[Equation 7]}$$

In Equation 7, Proposed_HE indicating an improved conversion function may be a weighted-sum of HE and $HE_{inv}$. When the same weighted-sum is applied to HE and to $HE_{inv}$, Proposed_HE may be calculated according to Equation 8.

$$\text{Proposed\_HE}(n) = \frac{HE(n)}{2} + \frac{HE_{inv}(n)}{2} \quad \text{[Equation 8]}$$
$$= \frac{Pixel_{total} + CDF(n) - CDF_{inv}(n)}{Pixel_{total} \times 2} \times B_{max}$$

Equation 9 may be formulated based on Equation 6 and Equation 8.

In operation S440, an output image may be generated by applying the HE scheme to the input image based on the conversion function.

$$\text{Proposed\_HE}(n) = \frac{CDF(n) - \frac{Hist(n)}{2}}{Pixel_{total}} \times B_{max} \quad \text{[Equation 9]}$$

In terms of implementation of hardware, implementation based on Equation 9 may be performed by adding "−Hist(n)/2" to the implementation based on Equation 4.

The conversion function may be configured as a look-up table.

Figure 5:
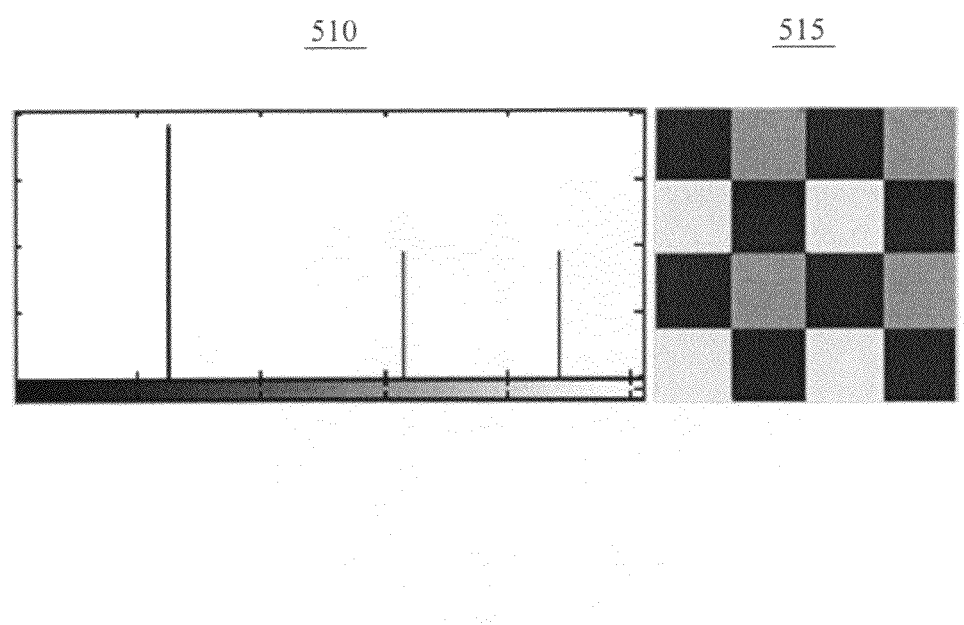
FIG. 5 is a diagram illustrating a simulation result of an automatic brightness adjusting method using a cumulative distribution function and an inverse cumulative distribution function according to an embodiment of the present invention.

FIG. 5 illustrates a simulation result of an automatic brightness adjusting method using a cumulative distribution function and an inverse cumulative distribution function according to an embodiment of the present invention.

Proposed_He image 515 may be generated by applying a scheme described with reference to FIG. 3 to the first image 215 of FIG. 2. A histogram 510 may be a histogram of the Proposed_He image 515.

The Proposed_He image 515 may have an improved contrast when compared to the original image 215 or the HE image 235. The histogram 510 may not be intensively distributed in a high brightness band or a low brightness band.

Figure 6:
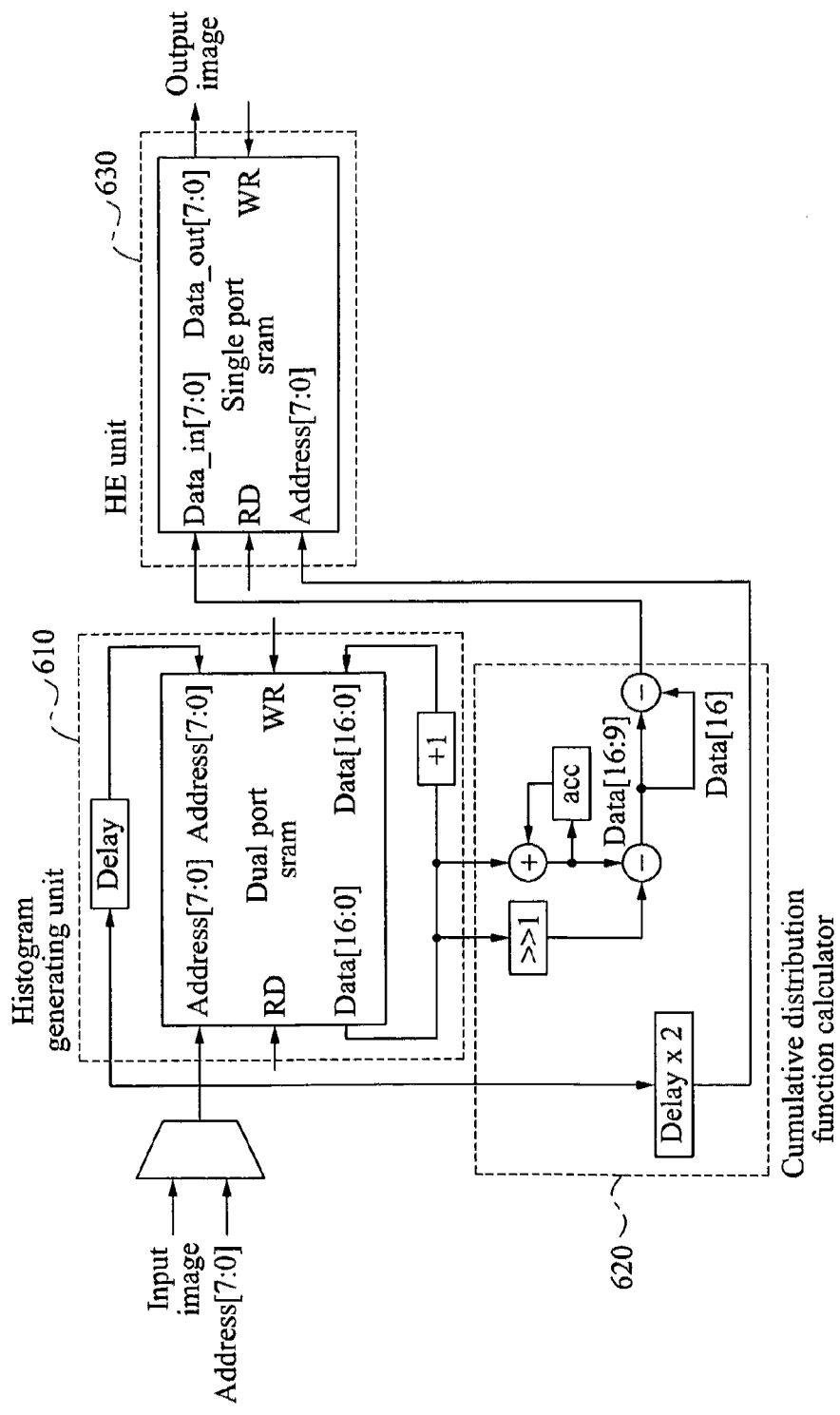
FIG. 6 is a diagram illustrating a configuration of an image processing apparatus that performs automatic brightness adjustment.

FIG. 6 illustrates a configuration of an image processing apparatus 600 that performs automatic brightness adjustment.

The image processing apparatus 600 may include an image signal processor (ISP) for a moving picture camera having a high definition. The image processing apparatus 600 may be a component included in the ISP and may supplement an automatic adjusting function of the ISP.

The image processing apparatus 600 may include a histogram generating unit 610, a cumulative distribution function calculator 620, and an HE unit 630.

The histogram generating unit 610 may generate a histogram of brightness values of pixels of an input image.

The histogram generating unit 610 may perform sampling of the pixels in the input image, and may generate the histogram based on the sampled pixels.

The cumulative distribution function calculator 620 may generate a cumulative distribution function and an inverse cumulative distribution function based on the generated histogram.

The HE unit 630 may generate a conversion function based on the cumulative distribution function and the inverse cumulative distribution function, may apply an HE scheme to the input image based on the conversion function, and may generate an output image.

The histogram HE unit 630 may include a look-up table. The HE unit 630 may embody the conversion function based on the look-up table, and may apply the HE scheme to the input image based on the conversion function, through the look-up table.

The histogram generating unit 610, the cumulative distribution function calculator 620, and the HE unit 630 may include components as shown in FIG. 6.

For example, the histogram generating unit 610 may include a dual-port static random access memory (SRAM), and the HE unit 630 may include a single-port SRAM.

Here, operational principles of the histogram generating unit 610, the cumulative distribution function calculator 620, and the HE unit 630 will be described with reference to FIG. 6.

For example, the cumulative distribution function calculator 620 may apply a shift operation to a value indicating a number of pixels included in the input image so as to calculate a number of pixels used for generating the histogram or an approximate value of the number of pixels used for generating the histogram. The number of pixels included in the input image may be divided by 2n through the shift operation. Here, n denotes a number of bits corresponding to movement by the shift operation. In this example, the number of pixels obtained as a result of the shift operation and the number of pixels that are actually used for generating the histogram may not be exactly the same. In this example, a predetermined amount of error may be allowed between the two values.

To reduce the error, Hist (k) may be obtained by adding a predetermined value to a number of pixels having a brightness value of k among pixels included in an image. That is, by checking brightness values of the pixels in the image, Hist (k) may be initialized to a predetermined value different from 0, before Hist (k) is calculated.

For example, the histogram generating unit 610 may use a brightness value of a pixel in the input image as a memory access address of an SRAM. The histogram generating unit 610 may read a data value using the memory access address, and may increase the read data value by 1 so as to write the increased data value.

For example, when all pixel data in one frame is input to the dual-port SRAM of the histogram generating unit 610, the histogram of the input image may be completed. An operation based on Equation 9 may be performed while vertical synchronization of an image is performed by a control block and thus, a result value of the operation may be stored in the single-port SRAM of the HE unit 630.

Embodiments of the present invention described with reference to FIGS. 1 through 5 will be applicable to the present embodiment and thus, detailed descriptions thereof will be omitted for conciseness.

Figure 7:
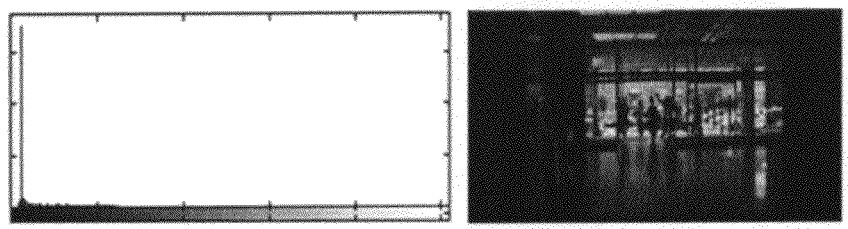
FIGS. 7 through 9 are diagrams illustrating simulation results according to an embodiment of the present invention.
Figure 7:
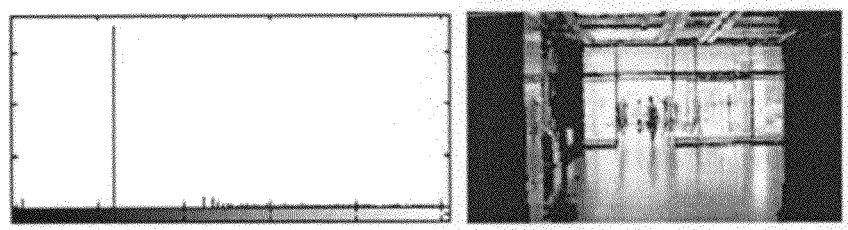
Figure 7:
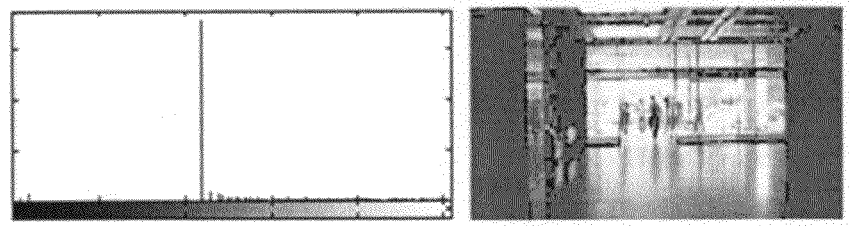
Figure 7:
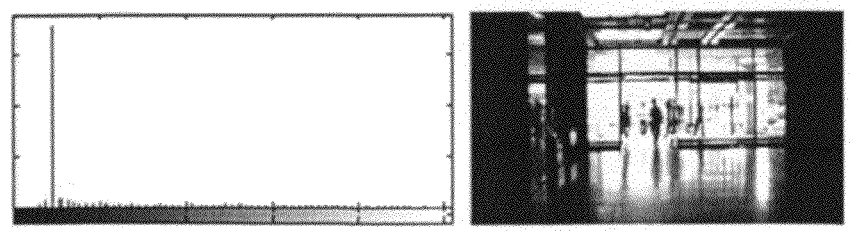
Figure 8:
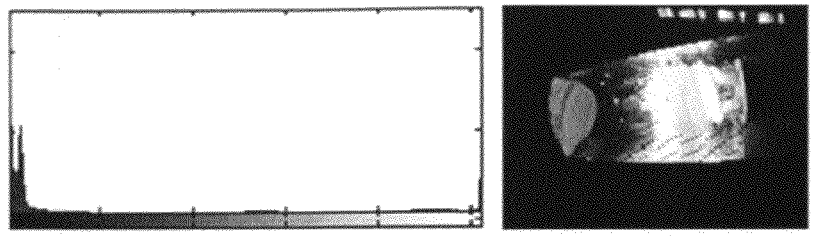
Figure 8:
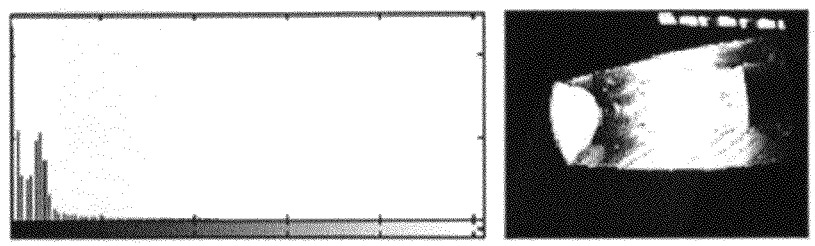
Figure 8:
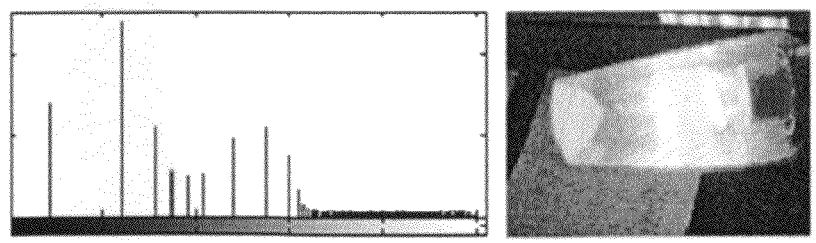
Figure 8:
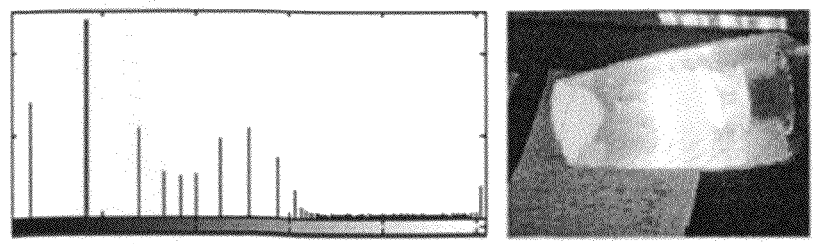
Figure 9:
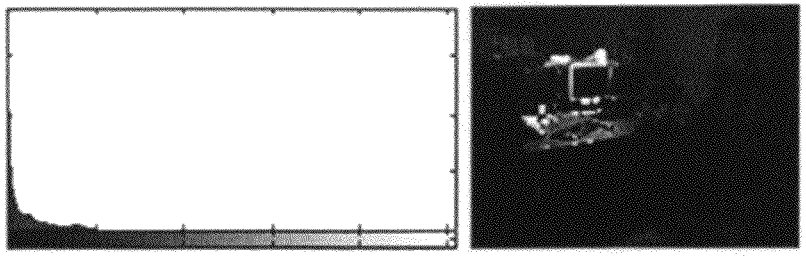
Figure 9:
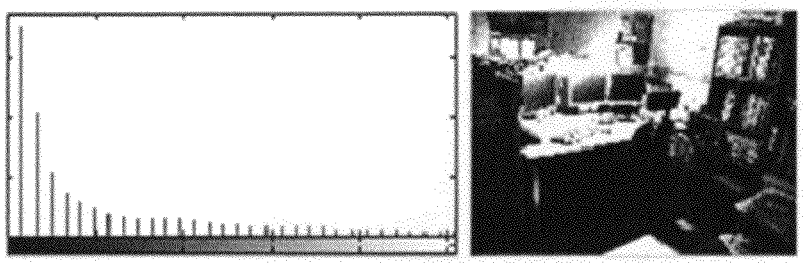
Figure 9:
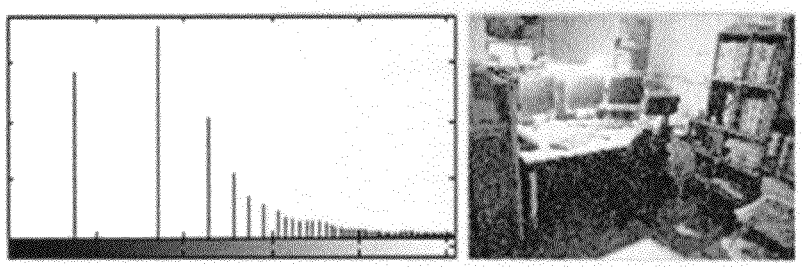
Figure 9:
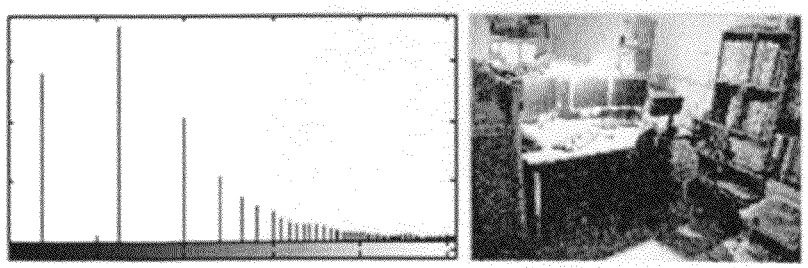

FIGS. 7 through 9 illustrate simulation results according to an embodiment of the present invention.

Referring to FIGS. 7 through 9, first images and first histograms, that is, a first image and a first histogram 710, a first image and a first histogram 810, and a first image and a first histogram 910, are original images and histograms associated with the original images, respectively.

The original images are generally dark and have narrow histogram distributions.

Referring to FIGS. 7 through 9, second images and second histograms, that is, a second image and a second histogram 720, a second image and a second histogram 820, and a second image and a second histogram 920, are AE images and histograms associated with the AE images, respectively.

The original images that are generally dark are forcibly converted by an AE scheme to have an average brightness. In this example, areas having a relatively high brightness in the original images may be saturated in AE images, and a blur effect may occur. Also, the brightness intensively distributed in the original images may not be completely equalized in the AE images. Accordingly, a contrast of the AE images may be low.

Referring to FIGS. 7 through 9, third images and third histograms, that is, a third image and a third histogram 730, a third image and a third histogram 830, and a third image and a third histogram 930, are HE images and histograms associated with the HE images, respectively.

Generally, HE images have a good quality when compared to the AE images. Referring to the third histograms, brightness distributions of darkest areas moves toward a high brightness band, and brightness distributions of brightest areas are intensively distributed in a maximum value of brightness values.

Referring to FIGS. 7 through 9, fourth images and fourth histograms, that is, a fourth image and a fourth histogram 740, a fourth image and a fourth histogram 840, and a fourth image and a fourth histogram 940, are improved HE images and histograms associated with the improved HE images, respectively.

In the improved HE images, dark areas have a relatively lower brightness value when compared to the HE images. Accordingly, the improved HE images may have an improved contrast.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of automatically adjusting a brightness of an image, the method comprising:
   generating a histogram of brightness values of pixels of an input image;
   generating a conversion function based on a cumulative distribution function and an inverse cumulative distribution function of the histogram; and
   generating an output image by applying, based on the conversion function, histogram equalization (HE) to the input image;
   wherein the HE is based at least partly on the cumulative distribution function or the inverse cumulative distribution function, a total numbers of pixels used for generating the histogram, and a maximum brightness value of the brightness values of the pixels of the input image; and
   wherein the inverse cumulative distribution function is generated according to Equation 2:

$$CDF_{inv}(n) = Pixel_{total} - CDF(n) + Hist(n), \quad \text{Equation 2}$$

where $CDF_{inv}$ denotes the inverse cumulative distribution function, $Pixel_{total}$ denotes a number of pixels used for generating the histogram, CDF denotes the cumulative distribution function, Hist denotes the histogram, and n denotes an integer greater than or equal to 0 and less than or equal to a maximum value of the brightness values.

2. The method of claim 1, wherein the generating of the histogram comprises:
   sampling the pixels of the input image; and
   generating the histogram based on the sampled pixels.

3. The method of claim 1, wherein the generating of the conversion function comprises:
   generating the cumulative distribution function and the inverse cumulative distribution function, based on the histogram; and
   generating the conversion function based on the cumulative distribution function and the inverse cumulative distribution function.

4. The method of claim 1, wherein the cumulative distribution function is generated according to Equation 1:

$$CDF(n) = \sum_{k=0}^{n} Hist(k),\qquad \text{[Equation 1]}$$

where CDF denotes the cumulative distribution function, Hist denotes the histogram, k denotes a brightness value, and n denotes an integer greater than or equal to 0 and less than or equal to a maximum value of the brightness values.

5. The method of claim 1, wherein the inverse cumulative distribution function is generated based on a number of pixels used for generating the histogram, the cumulative distribution function, and the histogram.

6. A method of automatically adjusting a brightness of an image, the method comprising:
generating a histogram of brightness values of pixels of an input image;
generating a conversion function based on a cumulative distribution function and an inverse cumulative distribution function of the histogram; and
generating an output image by applying, based on the conversion function, histogram equalization (HE) to the input image;
wherein the HE is based at least partly on the cumulative distribution function or the inverse cumulative distribution function, a total numbers of pixels used for generating the histogram, and a maximum brightness value of the brightness values of the pixels of the input image;
wherein the conversion function is generated based on a first HE function that is based on the cumulative distribution function and a second HE function that is based on the inverse cumulative distribution function; and
wherein the second HE function is generated according to Equation 4:

$$HE_{inv}(n) = \frac{\text{Pixel}_{Total} - CDF_{inv}(n)}{\text{Pixel}_{total}} \times B_{max},\qquad \text{[Equation 4]}$$

where $HE_{inv}$ denotes the second HE function, $CDF_{inv}$ denotes the inverse cumulative distribution function Pixel$_{total}$ denotes a number of pixels used for generatin the histogram, $B_{max}$ denotes a maximum value of the brightness values of the pixels of the input image, and n denotes an integer greater than or equal to 0 and less than or equal to $B_{max}$.

7. The method of claim 6, wherein the first HE function is generated according to Equation 3:

$$HE(n) = \frac{CDF(n)}{\text{Pixel}_{total}} \times B_{max},\qquad \text{[Equation 3]}$$

where HE denotes the first HE function, CDF denotes the cumulative distribution function, Pixel$_{total}$ denotes a number of pixels used for generating the histogram, $B_{max}$ denotes a maximum value of the brightness values of the pixels of the input image, and n denotes an integer greater than or equal to 0 and less than or equal to $B_{max}$.

8. The method of claim 6, wherein the conversion function is a weighted-sum of the first HE function and the second HE function.

9. The method of claim 6, wherein the conversion function is generated according to Equation 5:

$$\text{Proposed\_HE}(n) = \frac{HE(n)}{2} + \frac{HE_{inv}(n)}{2},\qquad \text{[Equation 5]}$$

where Proposed_HE denotes the conversion function, HE denotes the first HE function, $HE_{inv}$ denotes the second histogram, and n denotes an integer greater than or equal to 0 and less than or equal to a maximum value of the brightness values.

10. The method of claim 1, wherein the conversion function is generated according to Equation 6:

$$\text{Proposed\_HE}(n) = \frac{\text{Pixel}_{total} + CDF(n) - CDF_{inv}(n)}{\text{Pixel}_{total} \times 2} \times B_{max},\qquad \text{[Equation 6]}$$

where Proposed_HE denotes the conversion function, Pixel$_{total}$ denotes a number of pixels used for generating the histogram, CDF denotes the cumulative distribution function, $CDF_{inv}$ denotes the inverse cumulative distribution function, $B_{max}$ denotes a maximum value of the brightness values of the pixels of the input image, and n denotes an integer greater than or equal to 0 and less than or equal to $B_{max}$.

11. The method of claim 1, wherein the conversion function is generated according to Equation 7:

$$\text{Proposed\_HE}(n) = \frac{CDF(n) - \dfrac{Hist(n)}{2}}{\text{Pixel}_{total}} \times B_{max},\qquad \text{[Equation 7]}$$

where Proposed_HE denotes the conversion function, Pixel$_{total}$ denotes a number of pixels used for generating the histogram, CDF denotes the cumulative distribution function, Hist denotes the histogram, $B_{max}$ denotes a maximum value of the brightness values of the pixels of the input image, and n denotes an integer greater than or equal to 0 and less than or equal to $B_{max}$.

12. The method of claim 1, wherein the conversion function is configured as a look-up table.

13. An image processing apparatus, the apparatus comprising:
a histogram generating unit to generate a histogram of brightness values of pixels of an input image;
a cumulative distribution function calculator to generate a cumulative distribution function and an inverse cumulative distribution function; and
a histogram equalization (HE) unit to generate a conversion function based on the cumulative distribution function and the inverse cumulative distribution function, and to generate an output image by applying, based on the conversion function, HE to the input image;
wherein the HE is based at least partly on the cumulative distribution function or the inverse cumulative distribution function, a total numbers of pixels used for generating the histogram, and a maximum brightness value of the brightness values of the pixels of the input image; and
wherein the inverse cumulative distribution function is generated according to Equation 2:

$$CDF_{inv}(n) = \text{Pixel}_{total} - CDF(n) + Hist(n),\qquad \text{Equation 2}$$

where $CDF_{inv}$ denotes the inverse cumulative distribution function, $Pixel_{total}$ denotes a number of pixels used for generating the histogram, CDF denotes the cumulative distribution function, Hist denotes the histogram, and n denotes an integer greater than or equal to 0 and less than or equal to a maximum value of the brightness values.

14. The apparatus of claim 13, wherein:
the histogram generating unit comprises a dual-port static random access memory (SRAM), and
the HE unit comprises a single-port SRAM.

15. The apparatus of claim 14, wherein a brightness value of a pixel of the input image is input as an address of the dual-port SRAM, and a data value of the address of the dual-port SRAM is increased by 1 due to the input.

16. The apparatus of claim 13, wherein the HE unit applies, based on the conversion function, HE to the input image by utilizing a look-up table.

17. The apparatus of claim 13, wherein the cumulative distribution function calculator applies a shift operation to a value indicating a number of pixels of the input image so as to calculate an approximate value of a number of pixels used for generating the histogram.

18. The apparatus of claim 13, wherein the histogram generating unit performs sampling of the pixels of the input image, and generates the histogram based on the sample pixels.

* * * * *